(12) United States Patent
Pennings

(10) Patent No.: US 6,594,827 B1
(45) Date of Patent: Jul. 15, 2003

(54) METHOD AND AN ARRANGEMENT FOR INTEGRATED RADIO TELECOMMUNICATION VIA A CATV NETWORK

(75) Inventor: Jacobus Pennings, Mijdrecht (NL)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/214,911

(22) PCT Filed: Jul. 18, 1997

(86) PCT No.: PCT/EP97/03962

§ 371 (c)(1),
(2), (4) Date: Aug. 23, 1999

(87) PCT Pub. No.: WO98/04086

PCT Pub. Date: Jan. 29, 1998

(30) Foreign Application Priority Data

Jul. 19, 1996 (EP) .............................. 96202060

(51) Int. Cl.[7] .......................... H04N 7/173; H04H 7/00; H04Q 7/20

(52) U.S. Cl. ...................... 725/106; 725/126; 725/127; 455/3.05; 455/465

(58) Field of Search ................. 348/6, 10, 12, 348/13, 14, 17, 11, 8, 9; 455/3.1, 5.1, 6.3, 6.6, 4.1, 4.2, 6.2; 340/825.081, 825.22; 370/294, 296, 295; 725/105, 106, 127

(56) References Cited

U.S. PATENT DOCUMENTS

| | | | | |
|---|---|---|---|---|
| 5,027,426 A | * | 6/1991 | Chiocca, Jr. ................ | 725/106 |
| 5,181,106 A | * | 1/1993 | Sutherland .................. | 725/119 |
| 5,381,459 A | * | 1/1995 | Lappington ................. | 455/426 |
| 5,421,030 A | * | 5/1995 | Baran ........................... | 725/106 |
| 5,440,335 A | * | 8/1995 | Beveridge .................... | 725/106 |
| 5,499,241 A | * | 3/1996 | Thompson et al. .......... | 370/486 |
| 5,534,912 A | * | 7/1996 | Kostreski .................... | 725/106 |

(List continued on next page.)

FOREIGN PATENT DOCUMENTS

| | | | | |
|---|---|---|---|---|
| EP | 0 664 637 | 7/1995 | | |
| EP | 0 695 092 | 1/1996 | | |
| WO | WO95/27352 | 10/1995 | | |
| WO | WO95/34168 | 12/1995 | | |
| WO | 95/34168 | * 12/1995 | .......... | H04N/7/173 |
| WO | WO-96/24228 | * 8/1996 | ............ | H04Q/7/24 |
| WO | WO-98/24238 | * 6/1998 | .......... | H04N/7/173 |

OTHER PUBLICATIONS

"Novel Radio Access Principles Useful For Third Generation Mobile Radio Systems", D. Akerberg, Ericsson Radio Systems AB, IEEE, pp. 1.2.1–1.2.6, 1992.*

(List continued on next page.)

Primary Examiner—Vivek Srivastava

(57) ABSTRACT

A method of and an arrangement for integrated telecommnunication via a Cable TeleVision (CaTV) network (3–14) in a first or downstream direction from a head-end section (2) to subscriber sections (20) and in a second or upstream direction from the subscriber sections (20) to the first or head-end section (2). First transmission equipment (18, 19, 23) serve downstream and upstream communication in accordance with the Digital Enhanced Cordless Telecommunications (DECT) standard. The first transmission equipment (18, 19, 23) comprises a plurality of radio access units arranged at distribution and/or district centers (11) of said CaTV network (3–14) operating at a low-end frequency sub-band of the CaTV network (3–14). Network Termination Units (20, 30, 43) are provided comprising DECT conversion means (39) for radio communication at the standard DECT frequency band.

11 Claims, 7 Drawing Sheets

U.S. PATENT DOCUMENTS

| | | | |
|---|---|---|---|
| 5,553,064 A | * 9/1996 | Paff et al. | 370/478 |
| 5,583,864 A | * 12/1996 | Lightfoot et al. | 370/396 |
| 5,638,422 A | * 6/1997 | Roman | 455/562 |
| 5,729,824 A | * 3/1998 | O'Neill et al. | 725/106 |
| 5,745,836 A | * 4/1998 | Williams | 725/125 |
| 5,764,734 A | * 6/1998 | Medendorp et al. | 725/106 |
| 5,917,810 A | * 6/1999 | De Bot | 370/294 |
| 5,920,813 A | * 7/1999 | Evans et al. | 455/422 |
| 5,926,479 A | * 7/1999 | Baran | 370/395 |
| 6,047,177 A | * 4/2000 | Wickman | 455/422 |
| 6,172,673 B1 | * 1/2001 | Leftinen et al. | 725/105 |
| 6,314,302 B1 | * 11/2001 | Haferbeck et al. | 455/550 |
| 6,343,220 B1 | * 1/2002 | Van Der Salm | 455/552 |
| 2002/0118676 A1 | * 8/2002 | Tonnby et al. | 370/352 |

OTHER PUBLICATIONS

"Novel Radio Access Principles Useful For Third Generation Mobile Radio Systems", D. Åkerberg, Ericsson Radio System AB, IEEE, 1992, pp. 1.2.1–1.2.6, XP 000567968.

* cited by examiner

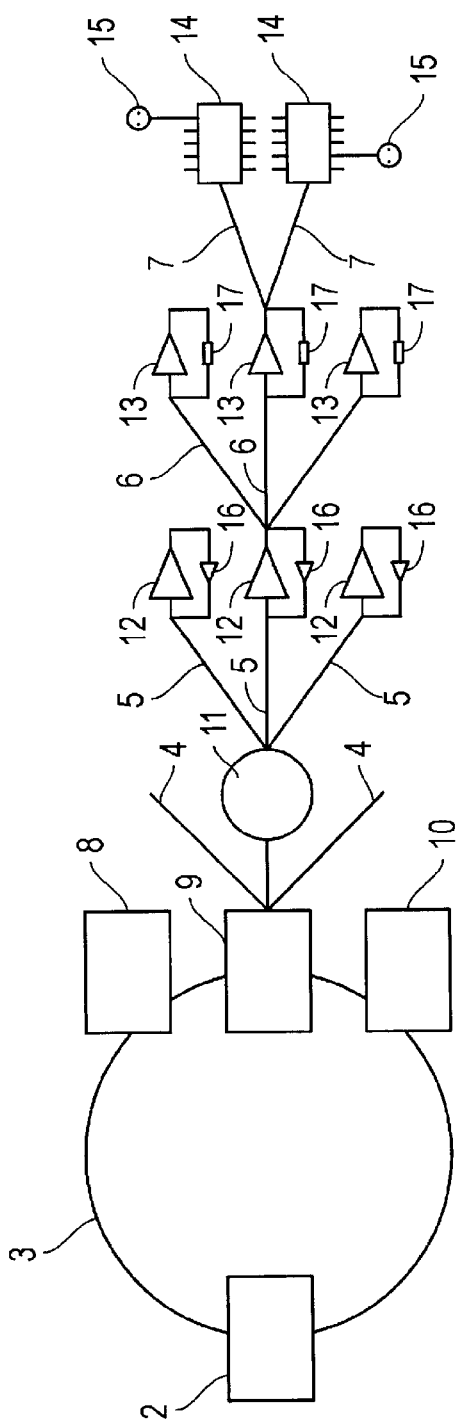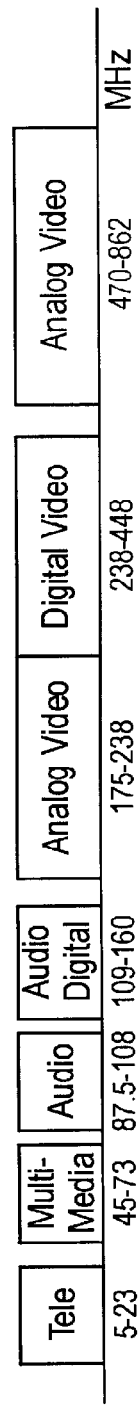
FIG. 1
(Prior Art)
FIG. 2
(Prior Art)

METHOD AND AN ARRANGEMENT FOR INTEGRATED RADIO TELECOMMUNICATION VIA A CATV NETWORK

FIELD OF THE INVENTION

The present invention relates to a method and an arrangement for radio telecommunication such as telephony, video, audio and/or high rate data and interactive data communication via a cable television network.

BACKGROUND OF THE INVENTION

Telecommunication services are, for the greater part, bounded to dedicated networks. Speech communication is mainly provided by the Public Switch Telephony Network (PSTN). Video and audio communication is handled by Cable TeleVision (CaTV) networks, and high rate data communication is exchanged over distinct data networks, for example. This results, at the users' site, in as many as access provisions as the number of networks of which a user requires services.

With the increase of telecommunication services applied by a user, a trend to integration or convergence of services can be envisaged. Computer Integrated Telephony (CIT) is an example of the integration of telephony and data services, where video conferencing is the result of the integration of telephony and video communications. Service integration at the operators' site will inevitably lead to integrated workstations for video, telephony, data communications etc. at the users' premises.

In a next step, integration at the network level will take place for which standards like Asynchronous Transfer Mode (ATM) are currently under construction. Internet can be regarded as a first introduction of an integrated or converged network with which from an integrated (multi-media) workstation over an integrated network (Internet) a number of the above distinct services are available. However, it is yet still not clear at which point in time a final integrated network will be available to the majority of telecommunication users.

In the meantime there is a need for a cost effective and quickly to implement solution to provide the best possible integration of telecommunication services on existing networks.

SUMMARY OF THE INVENTION

It is an object of the present invention to provide a solution for an integral provision of telecommunication services such as speech or telephony, video, audio, high rate data and interactive data communications.

It is a further object of the present invention to provide an integrated services network terminal unit for use at the subscriber or user premises.

According to the present invention there is provided an arrangement for integrated telecommunication via a Cable TeleVision (CaTV) network in a first or downstream direction from a first or head-end section to second or subscriber sections and in a second or upstream direction from the second or subscriber sections to the first or head-end section, through intermediate trunk, distribution, district, feeder and drop sections, intermediate trunk units connecting the trunk and distribution sections, and distribution and/or district centers connecting the distribution and district sections, and first communication means operative through the CaTV network at a low-end frequency sub-band thereof in accordance with the Digital Enhanced Cordless Telecommunications (DECT) standard, characterized in that the first communication means comprise a plurality of radio access units arranged at the distribution and/or district centers for communication with the subscriber sections through the district, feeder and drop sections of the CaTV network, and wherein the subscriber sections comprise Network Terminal Unit (NTU) means arranged for up-converting to the DECT standard frequency band of the low-end frequency sub-band DECT signals for radio transmission by the NTU means to provide wireless radio communication at the subscriber sections, and for down-converting to DECT signals for transmission at the low-end frequency sub-band in the CaTV network of signals at-the DECT standard frequency band received by the NTU means from wireless radio communication at the subscriber sections.

A typical CaTV network comprises a so-called head-end station equipped with receiver means for receiving signals transmitted by terrestrial satellite transmitters and other communication service providers. The received signals are frequency converted and transmitted by coaxial and/or optical cable via a trunk network and various distribution or district sections and intermediate trunk and distribution and/or district centers to individual CaTV subscriber terminals in the subscriber's homes. The trunk network serves to bridge relatively long distances between a head-end station and the various district sections. From the district sections a drop section serves the subscriber terminals through feeder cables and intermediate tap and amplifier units.

International patent application WO 95/34168 and European patent application 0,695,092 disclose simplified versions of CaTV and coax/fiber cable networks, wherein radio and TV signals and control and telephone data are transmitted from the head-end section to the individual subscribers. Downstream and upstream duplex channels occupy different frequency bands of the network, including the low-end CaTV frequency sub-band.

From a network reliability point of view, in case of a power supply failure, two-way communication (i.e. in the up-downstream directions) at the distribution, district, feeder and drop sections is only readily possible in the low-end CaTV frequency sub-band. However, this sub-band is susceptible for noise and other interferences.

Digital Enhanced Cordless Telecommunications (DECT) is a low power, high capacity Multi Carrier/Time Division Multiple Access/Time Division Duplex (MC/TDMA/TDD) digital radio access technique, providing ten radio carriers, each divided into 24 time-slots which serve 12 duplex 32 kb/s communication channels, called a frame. The 120 communication channels are continuously adaptively selected. A communication channel, when occupied, is individual to a radio link connection between a radio access station an a particular remote telecommunication unit, such as a cordless radio telephone. This type of access technique is known as Continuous Dynamic Channel Allocation (CDCA). The DECT protocol provides data exchange at rates of 32 kb/s or less up to 552 kb/s or more.

An elaborated discussion on DECT can be found in a paper by D. Åkerberg, "Novel Radio Access Principles Useful for the Third Generation Mobile Radio Systems", The Third IEEE International Symposium on Personal, Indoor and Mobile Radio Communication, Boston Massachusetts, Oct. 19–21, 1992, which paper is included here by reference.

The present invention is based on the insight that by providing the radio access units at the distribution and/or district centers, to each distribution or district section connecting to a distribution and/or district center the full 120 DECT communication channels are available. This different from radio access units installed at the head-end, which allows only 120 channels per CaTV network.

Those skilled in the art will appreciate that, instead of installing the radio access unit at the distribution and/or district centers, installation at the trunk units is also feasible, this dependent on the capacity required.

With the arrangement according to the invention, at the subscriber sections, wireless radio communication is provided, wherein subscribers having a mobile radio terminal can communicate in their neighbourhood via a connection with their own NTU and/or a neighbouring NTU. In case of NTU's connected to the same radio network, no complex roaming or handovers are required.

The NTU's preferably comprise DECT repeater units, which may connect over air to Fixed Access Units (FAU) in the home. These FAU may be provided with identity and access rights, such that the NTU's can be relatively ill equipped, merely serving as a conversion means, and NTU's at low costs can be provided.

The present invention further combines the advantages of the existing CaTV networks, i.e. high rate data capacity in downstream direction and a relatively low data rate capacity in the upstream direction by an arrangement further comprising second communication means operative in accordance with a second transmission protocol serving at least downstream communication at high data rates, and third communication means connected to said first and second communication means and serving at least downstream communication at high data rates and upstream communication at DECT based data rates through said first communication means.

The present invention is based on the insight that the majority of users, such as Internet users for example, generate relatively little traffic in the direction of the host or data source from which data are required (i.e. in the upstream direction of the CaTV network). The main data stream is in the direction of the users (i.e. in the downstream direction of the CaTV network). By combining, according to the present invention, a telephony based communication service operating at the CaTV network and the upstream communication requirements of a high data rate user, a very efficient use of the spectrum or frequency resources of a CaTV network is achieved.

In the preferred embodiment of the invention the second transmission protocol is operative at a video frequency band of the CaTV network. With this embodiment of the invention, there is no need for modifications of the existing CaTV transmission infrastructures.

The second transmission protocol may be chosen from among existing analogue or digital radio communication protocols for high data rate exchange, in particular a Time Division Multiple Access (TDMA) radio communication protocol. In a preferred embodiment of the invention high data rate exchange is provided over one or more 5 MHz bandwidth video channels of the CaTV network. Using the so-called 64 QAM modulation technique, data at 34 Mb/s can be exchanged over such as channel.

The invention relates also to a method of integrated telecommunication via a Cable TeleVision (CaTV) network in a first or downstream direction from a first or head-end section to second or subscriber sections and in a second or upstream direction from the second or subscriber sections to the first or head-end section, through intermediate trunk, distribution, district, feeder and drop sections, intermediate trunk units connecting the trunk and distribution sections, and distribution and/or district centers connecting the distribution and district sections, wherein communication is served through the CaTV network at a low-end frequency sub-band thereof in accordance with the Digital Enhanced Cordless Telecommunications (DECT) standard, characterized by the steps of serving upstream and downstream DECT communication at a low-end frequency sub-band of the district, feeder, and drop sections of the CaTV network, at the subscriber sections, up-converting to the DECT standard frequency band of the low-end frequency sub-band DECT signals by Network Terminal Unit (NTU) means and radio transmission of the up-converted DECT signals by the NTU means for providing wireless radio communication at the subscriber sections, and at the subscriber sections down-converting to DECT signals at the low-end frequency sub-band of the CaTV network and transmission thereof through the drop, feeder and district sections to the radio access units of signals at the DECT standard frequency band received by the NTU means.

The invention further provides a subscriber Network Terminal Unit (NTU) for use in an arrangement disclosed above, comprising first communication means operative in accordance with the Digital Enhanced Cordless Radio Telecommunications (DECT) standard, characterized by conversion means for up-converting to the DECT standard frequency band of DECT signals at a low-end frequency sub-band of a Cable TeleVision (CaTV) network for radio transmission by the NTU means for providing wireless radio communication at subscriber sections of the CaTV network and for down-converting to DECT signals for transmission at the low-end frequency sub-band in the CaTV network of signals at the DECT standard frequency band received by the NTU means from wireless radio communication at subscriber sections of the CaTV network.

The above-mentioned and other features and advantageous of the invention are illustrated in the following description with reference to the enclosed drawings.

BRIEF DESCRIPTION OF THE DRAWINGS

FIG. 1 shows, in a schematic and illustrative manner, a typical construction of a prior art CaTV network.

FIG. 2 shows a typical frequency spectrum of a prior art CaTV network and its services.

DETAILED DESCRIPTION OF THE EMBODIMENTS

Figure 3:
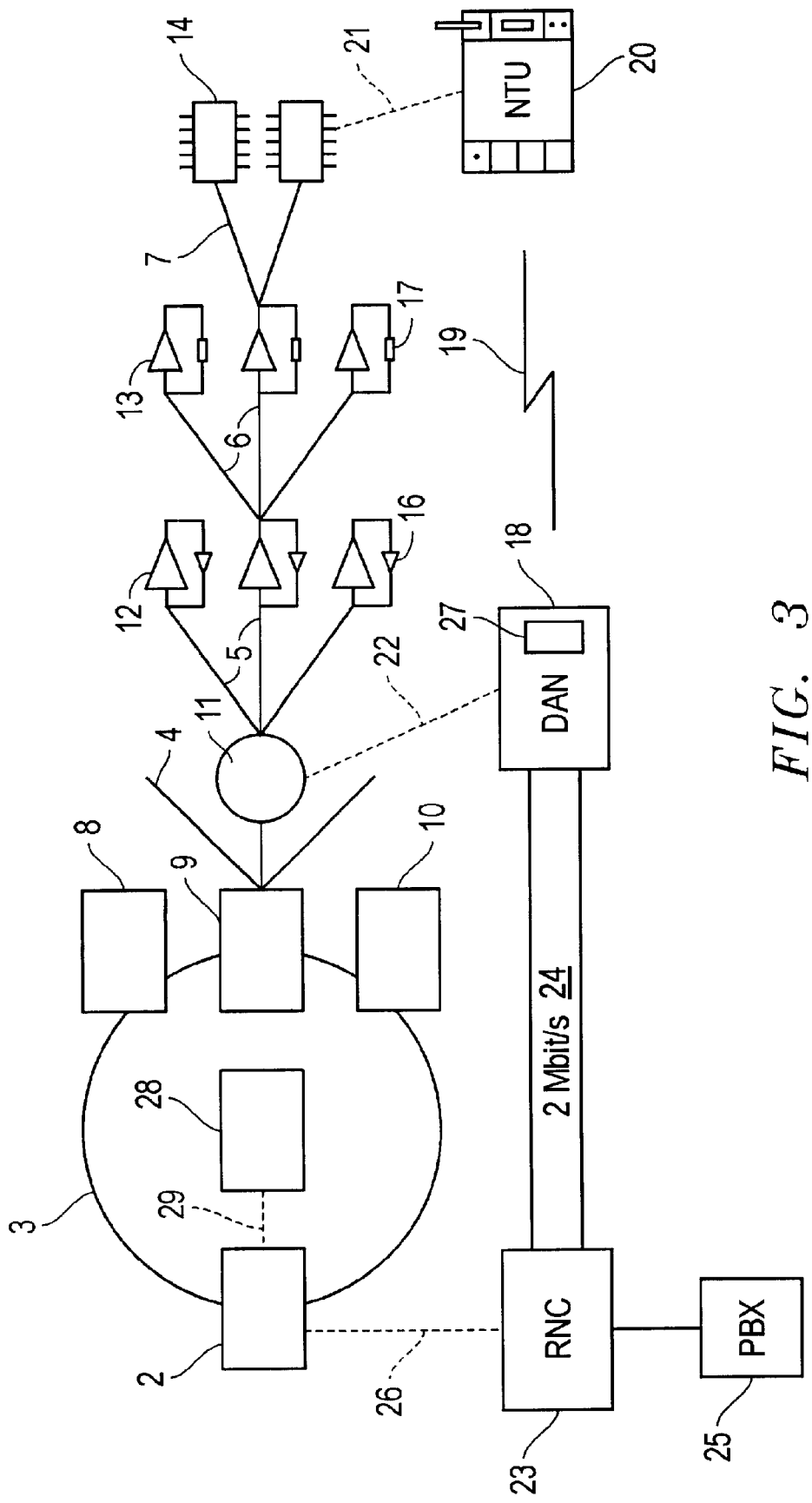
FIG. 3 shows, in a schematic and illustrative manner, an embodiment of an arrangement for radio telecommunication via a CaTV network according to the present invention.

Without the intention of a limitation, the invention will now be explained by its application in a Cable TeleVision (CaTV) network of the type which is common in the Netherlands.

FIG. 1 shows a typical construction of a CaTV network 1 for the distribution of broadcast signals, such as radio and TV programmes and other information signals which are received by or supplied to a head-end station 2.

At the head-end station 2 receiving and frequency conversion means are installed for receiving broadcast signals submitted by terrestrial, satellite and fixed line transmitters, respectively. The received and frequency converted signals are merged in the head-end station 2. The merged signals are distributed via a main or trunk network 3, distribution sections 4, district sections 5, feeder sections 6 and drop sections 7 to downstream subscriber CaTV terminals 15. The trunk network 3 is generally constructed from optical or fibre cable, whereas the distribution 4, district 5, feeder 6 and drop sections 7 are generally comprised of coaxial cable.

For signal distribution, the trunk network 3 connects to several trunk units 8, 9, 10 comprising amplifiers, splitters and the like, which trunk units 8, 9, 10 each connect through a distribution section 4 to a so-called distribution or district centre 11. Such district centre 11 likewise comprises amplifier, splitters, filter units and the like which are necessary for signal distribution over the CaTV network 1.

From the district centre 11 district sections 5 connect through intermediate amplifiers 12 which, via feeder sections 6, output amplifiers 13 and drop sections 7 connect to multi tap or splitter units 14, the outputs of which terminate at CaTV subscriber terminals 15 or clarity purposes, in the embodiment shown, only one branch of the CaTV network 1 is completely shown from the head end station 2 to a subscriber terminal 15. It will be appreciated that the other sections may have a similar construction.

The above described direction of the signal flow from the head end station 2 towards the subscriber terminals 15 is called downstream. The direction of the signal flow from the CaTV terminals 15 towards the head end station 2 is called upstream.

The intermediate amplifiers 12 comprise, in the upstream direction a bypass section which is generally an amplifier 16 or filter section, whereas the output amplifiers 13 may comprise a similar bypass amplifier or generally a filter section 17.

FIG. 2 shows the frequency spectrum of existing CaTV networks in the Netherlands. FM audio and digital audio radio signals are broadcast in the frequency bands ranging from 87.5–160 MHz. TV and video signals are transmitted in three frequency bands ranging from 175–862 MHz, as shown. The frequency band from 45–73 MHz is dedicated to data communication at relatively high speed, such as 64 kb/s. The low-end sub-band ranging from 5–23 MHz is used for interactive duplex data at telephony based data rates, such as telephony, alarm data, control data for telemetric applications etc. at data rates of 9.6, 14.4, 28.8 and 32 kb/s. The low-end frequency band may be even extended up to 40 MHz.

FIG. 3 shows a preferred arrangement according to the present invention for radio telecommunication in a CaTV network 1 as disclosed in FIG. 1. The arrangement shown serves upstream and downstream communication at telephony and telephony based data rates following the Digital Enhanced Cordless Telecommunications (DECT) protocol.

At the district centres 11 so-called DECT Access Node (DAN) equipment 18 is installed, as indicated with broken line 22. Such a DAN 18 comprises a number of radio access units 27 each comprising transceiver and communication control equipment, such as disclosed in the International Patent Application WO 94/19877 which relates to equipment operating in accordance with the DECT standard and which is incorporated here by reference.

Preferably, each district section 5 connects to at least one separate radio access unit 27 thereby providing the full DECT communication capacity (120 channels) to a district section 5.

The transceiver output of the radio access units connects to the district sections 5 for providing radio communication 19 at the low-end CaTV frequency sub-band from 5–23 MHz or even up to 40 MHz. In the case of standard DECT equipment, frequency conversion means are required, such to convert the DECT radio frequency (RF) of about 2 GHz down to the low-end CaTV frequency band. It is advantageous to use the low-end CaTV frequency sub-band for telephony services, alarms and the like, because this band is also available in case of a CaTV power supply breakdown.

From the DAN 18 a data link connection 24 of, for example, 2 Mb/s connects to a so called Radio Node Controller (RNC) 23, which in turn connects to a Private Branch Exchange (PBX) 25 and/or an exchange of a Public Switched Telephone Network (PSTN), for example. The data link connection 24 may be separate or form part of the CaTV network, for example a transmission channel occupied at a fibre optic trunk cable 3. The RNC 23 collects data from several DAN's 18 and data for exchange with the PBX 25. The RNC 23 and the PBX 25 are, preferably, installed at the head end station 2, as indicated with the broken line 26.

At the subscriber premises, i.e. connected to a terminal of the multi tap or splitter units 14, a so-called Network Terminating Unit (NTU) 20 is connected, in accordance with the invention. Embodiments of such an NTU 20 will be described and disclosed below.

Further, data server means 28 are provided for high data rate transmission downstream of the CaTV network in accordance with a chosen transmission protocol The data server means 28 are preferably installed at the head end station 2, as indicated with broken line 29, and connect to the RNC 23 and/or PBX 25, for example.

Figure 4:
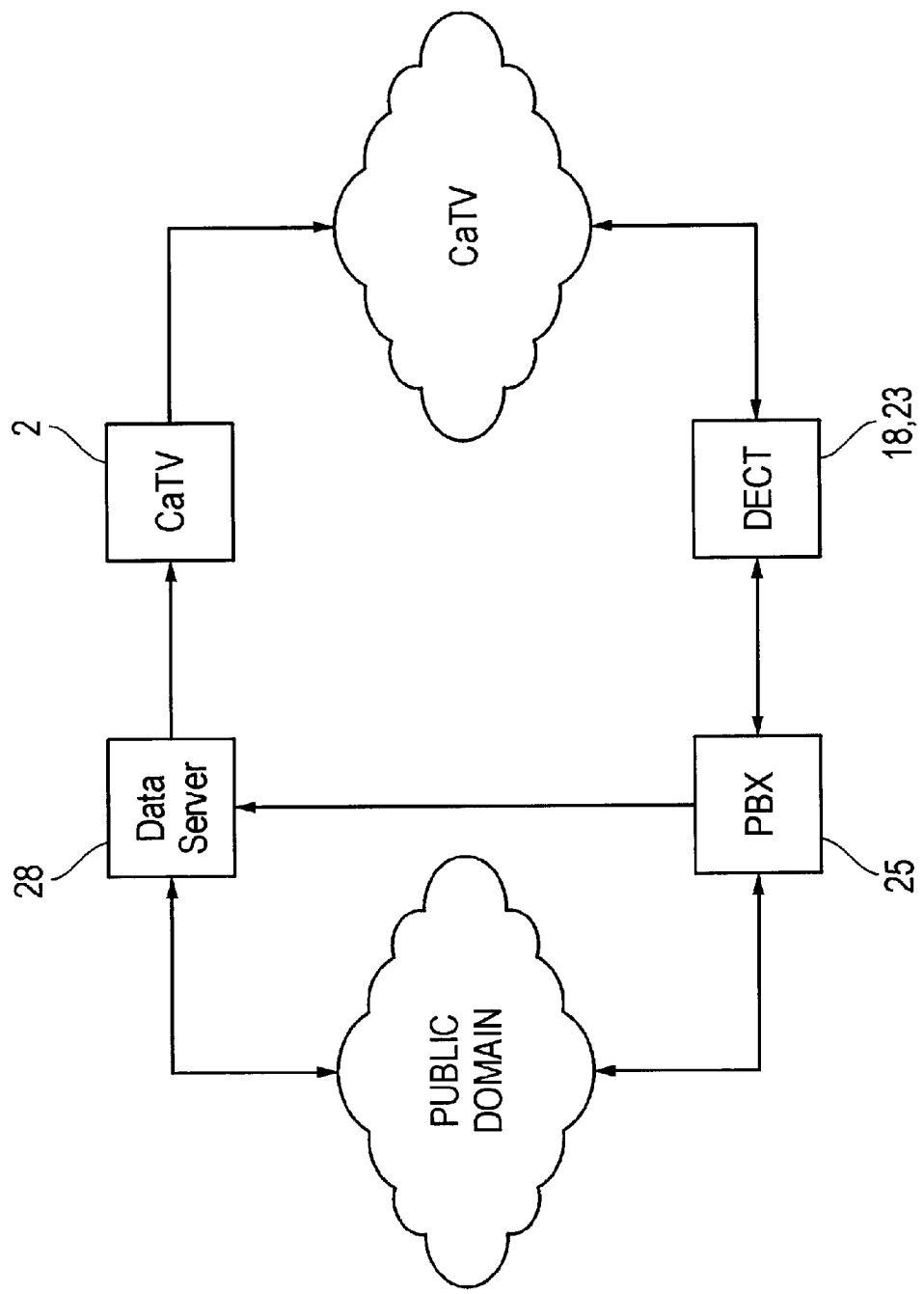
FIG. 4 shows, in a schematic and illustrative manner, the arrangement of Fig. from a product point of view.
Figure 5:
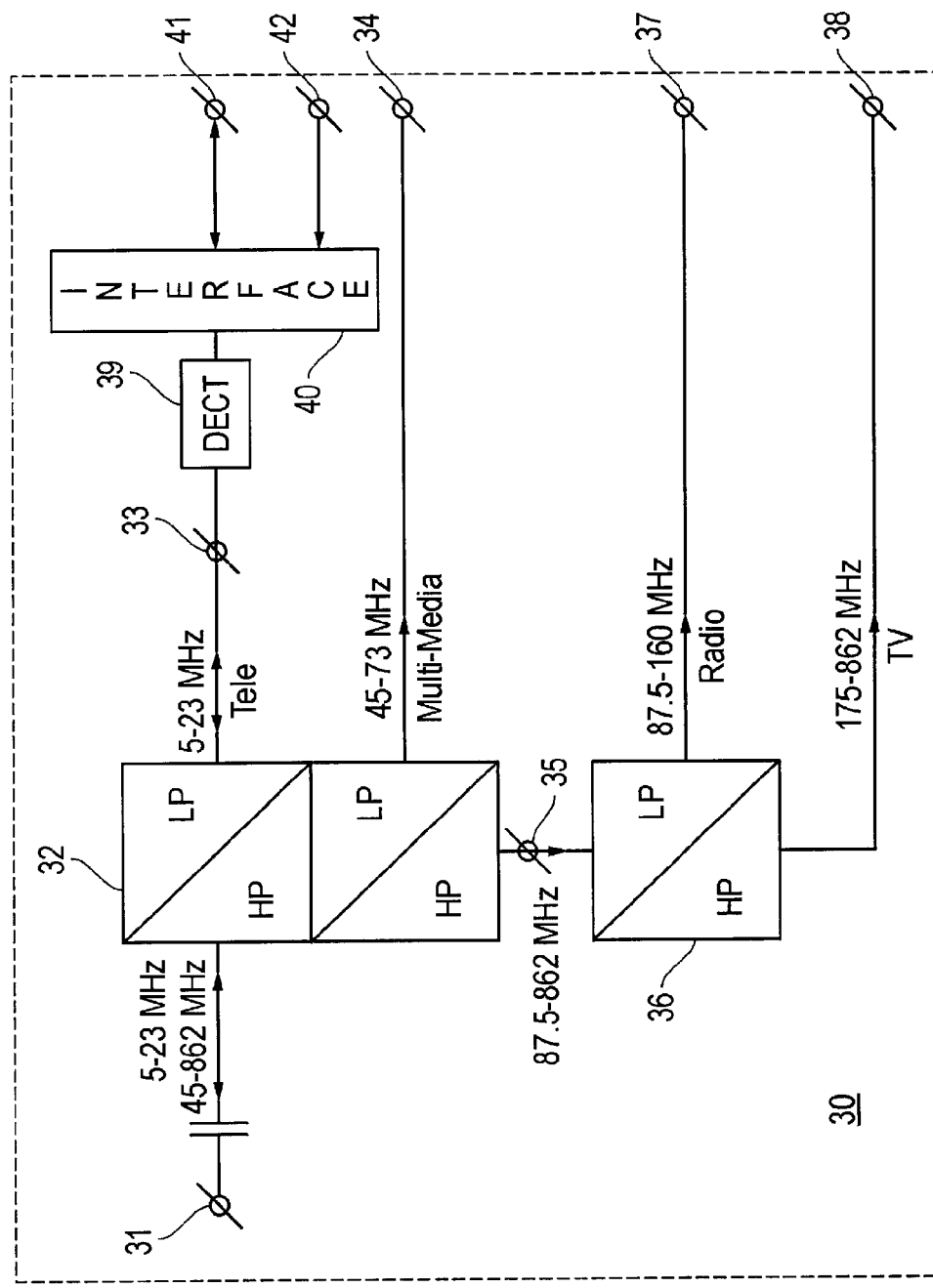
FIG. 5 shows a simplified block diagram of a first embodiment of a network terminal unit according to the present invention.

FIG. 4 shows, from an equipment point of view, the arrangement of the invention as shown in FIG. 5. The DECT equipment, i.e. the DAN's 18 and the RNC 23, may be comprised of commercially available parts from the Ericsson DRA 1900 product program. The PBX 25 may be an MD 110 of Ericsson, whereas the data server means 28 may, for example, be based on a standard Internet server with an ethernet (802.3) connection. The signal flows and their directions between the several equipment parts and the public domain and the CaTV network are indicated by arrow lines, such in accordance with the present invention.

FIG. 5 shows a first embodiment of an NTU 30 according to the present invention. A CaTV access terminal 31 connects to signal multiplexer/demultiplexer means comprising a first High Pass (HP)/Low Pass (LP) filter section 32 and a second HP/LP filter section 36. The first filter section 32 having a first access terminal 33 for duplex exchange of information signals at the low-end frequency band 5–23 (40) MHz, a second access terminal 34 from which the multimedia frequency band of 45–73 MHz is available and a third output terminal 35 providing the audio and video frequency bands of the CaTV network and which connects to the second HP/LP filter section 36. To this second filter section 36 connects an audio or radio output terminal 37 and a video or TV output terminal 38.

According to the invention, first communication means 39 serving downstream and upstream communication at telephony and telephony based data rates connect to the first access terminal 33 of the first filter section 32. In the embodiment shown, the first communication means 39 are operative in accordance with the DECT protocol and may comprise frequency conversion means, such as the frequency conversion means 27 described above. The first communication means connect to third communication means taking the form of an interface unit 40 and having a first access terminal 41 for telephony communication, for example, and a second access terminal 42 for upstream data communication in connection with the downstream high data rate communication which is available at the video or TV terminal 38.

In practice, the first access terminal 41 of the interface unit 40 may connect to an indoor antenna, for example, to provide at least indoor cordless or mobile radio communication. To this end, the first communication means 39 may be provided as a relay or DECT repeater device or the like. For the purpose of connecting a wired telephone terminal, for example, the first access terminal 41 may also comprise a conventional telephone socket, for example.

However, the communication means may also communicate to a Fixed Access Unit (FAU) installed at the subscriber premises for the connection of a fixed phone or for providing extra mobility in the home. This FAU (not shown) may be provided with access rights to a particular network. The communication means 39 than can be very ill equipped, just providing the function of DECT converter/repeater which makes these means 39 very cost efficient for use at a larged scale.

For data communication, a modem unit (not shown) may be connected to the second access terminal 42 of the interface unit 40 and the TV terminal 38. Such to provide a data link having a high data rate downstream and a telephony based data rate upstream communication capacity.

Figure 6:
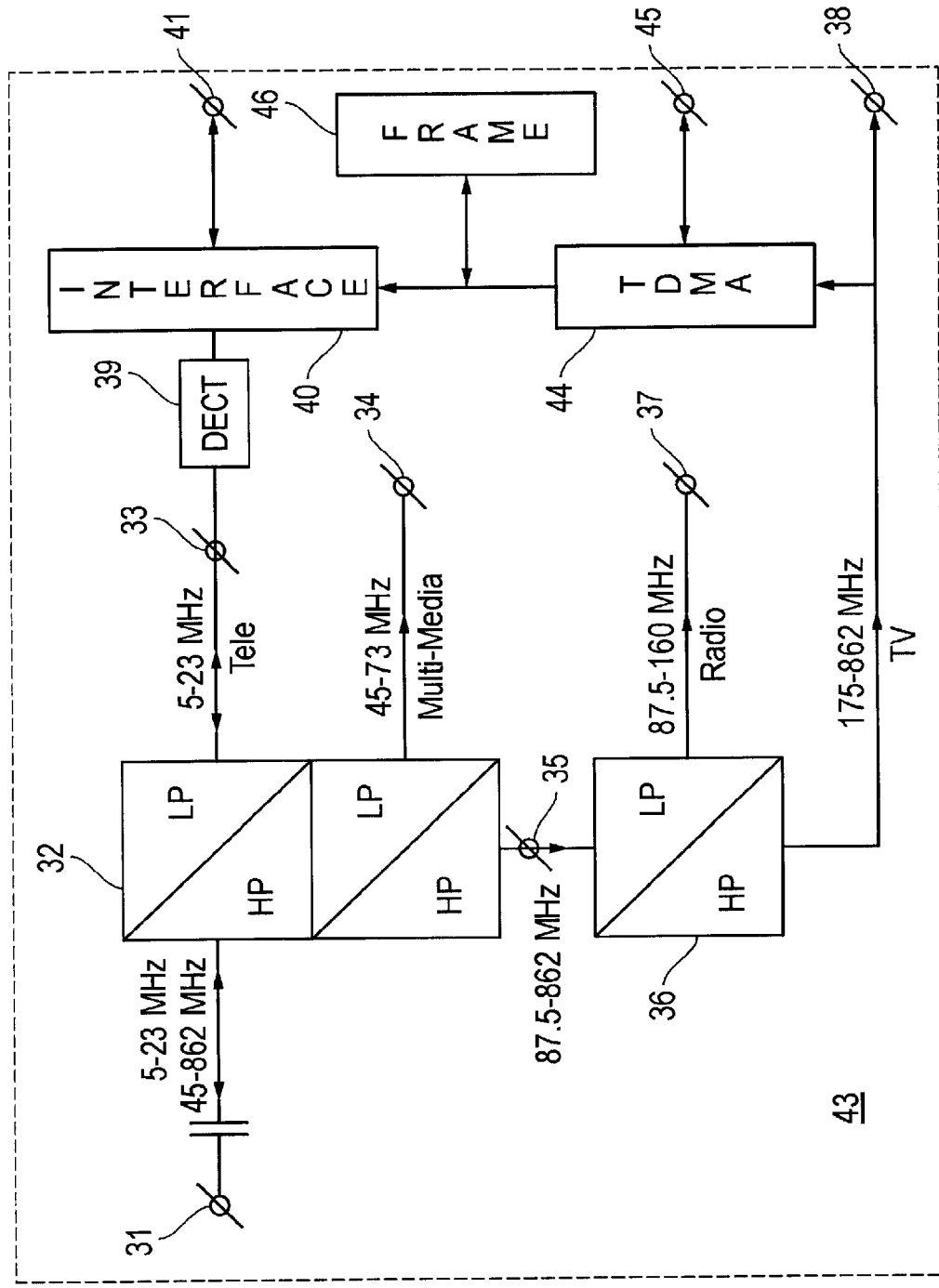
FIG. 6 shows a simplified block diagram of a second embodiment of a network terminal unit according to the present invention.

FIG. 6 shows a second embodiment of an NTU 43 according to the present invention. The interface unit 40 connects to second communication means 44 providing a common TDMA data bus or terminal 45, providing TDMA high rate data transmission downstream and TDMA telephony based data rate transmission upstream.

Further, a so-called frame relay multiplexer 46 may be provided, such to integrate data communications into the frames of the several TDMA protocols which may be operative.

Figure 7:
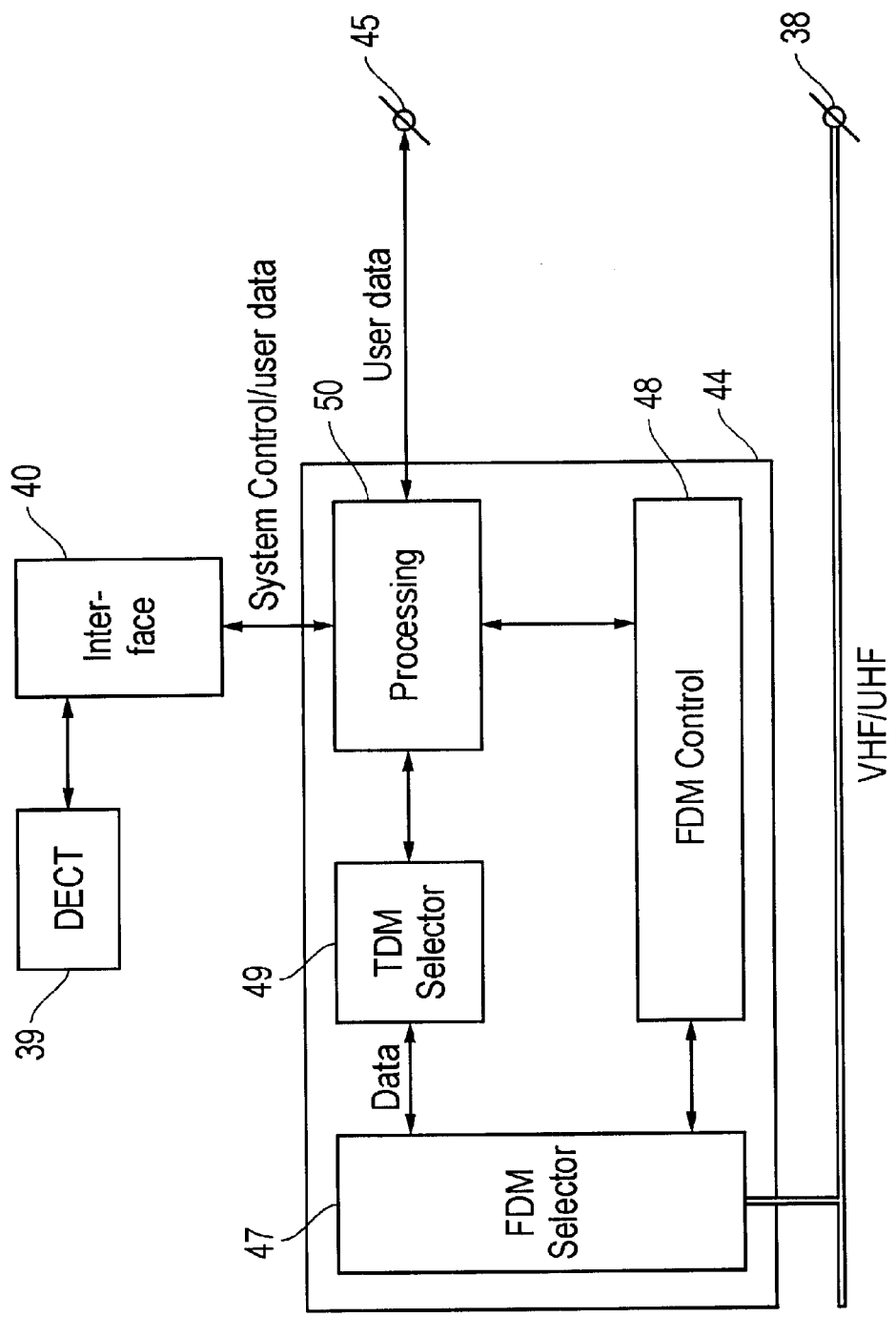
FIG. 7 shows a simplified block diagram of part of the network terminal unit according to the present invention shown in FIG. 6.

FIG. 7 shows a more detailed block diagram of the second communication means 44 of FIG. 5. High data rate information received via a video channel of the CaTV network, for example, is provided at a Frequency Division Multiplexer (FDM) 47 controlled by a so-called FDM Control device 48. Downstream data received are provided to a Time Division Multiplex (TDM) selector 49 and processed in a processing device 50 and outputted as user data at the data bus or terminal 45. Upstream user data and system control from the data bus 45 is processed and further transmitted to the first communication means 39 and interface means 40, described above.

Figure 8:
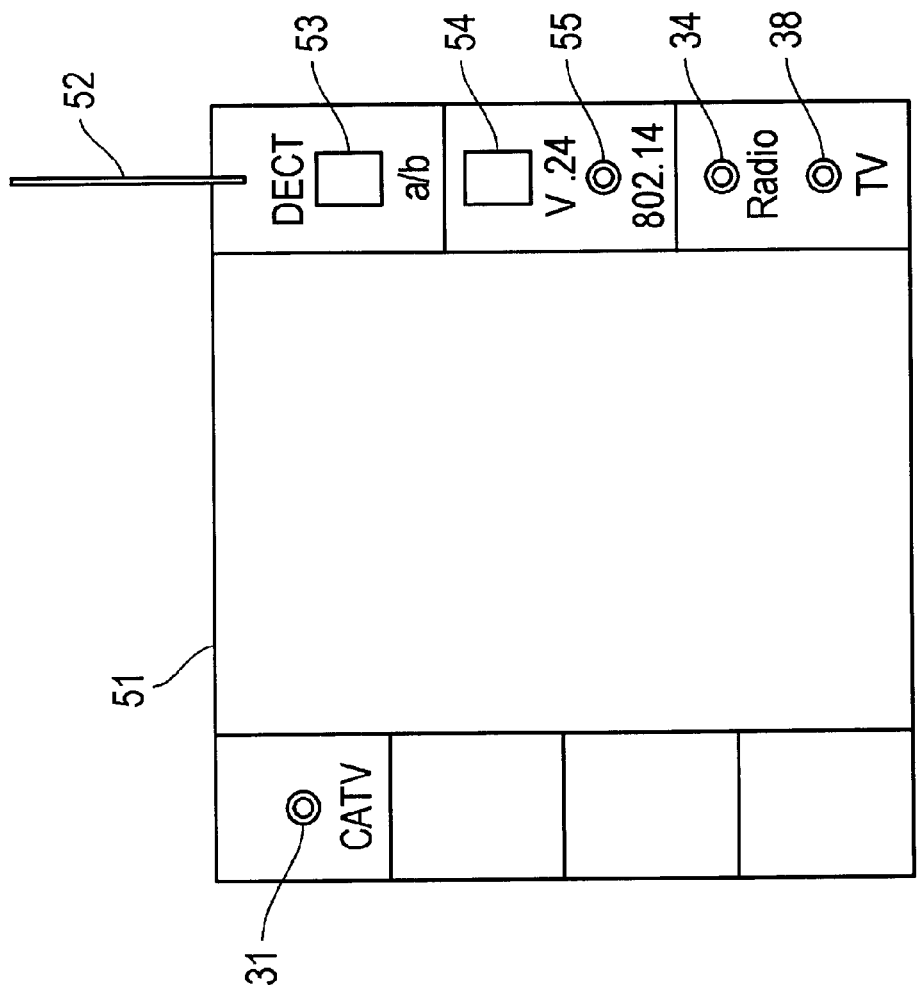
FIG. 8 shows a view of an embodiment of a subscriber interface unit or network terminal unit according to the present invention.

FIG. 8 shows a view of an embodiment of an NTU 51 according to the present invention, comprising a cordless DECT antenna 52, a conventional telephone socket 53, several data access terminals, such as a V.24-connection access terminal 54 and an 802.14-connection access terminal 55, as well as a radio and TV access terminal 34, 38, respectively. The CaTV access terminal 31 is, in the embodiment shown, located at the left hand corner of the NTU 51.

The skilled person will appreciate that the DAN's 18, in a less dense CaTV network for example, may also be positioned at the trunk units 8–10, or in the case of a CaTV network with heavy communication traffic at the DECT channels, more downstream of the CaTV network.

The invention provides a solution for integrated radio telecommunication over a CaTV network, comprising a standard upstream communication link based on telephony data-rates and a high data rate downstream communication link over an analogue CATV video channel.

The solution according to the invention may be based on general accepted telecommunication standards, protocols and equipment, which makes it attractive to implement at short notice and without excessive development or design costs and risks, and meets in an integrated manner a number of different telecommunication needs of users. Examples of telecommunication services which can be handled are cordless or mobile radio telephony, high speed Internet, alarms, meter reading, wireless Local Area Network (LAN) applications, Integrated Services Digital Network (ISDN) applications, datacast applications etc.

What is claimed is:

1. An arrangement for integrated telecommunication via a Cable TeleVision (CaTV) network in a first or downstream direction from a first or head-end section to second or subscriber sections and in a second or upstream direction from said second or subscriber sections to said first or head-end section, through intermediate trunk, distribution centers and distribution sections, district centers and district sections, feeder sections and drop sections, intermediate trunk units connecting said trunk and distribution sections, and distribution and/or district centers connecting said distribution and district sections, and first communication means operative through said CaTV network at a low-end frequency sub-band thereof in accordance with the Digital Enhanced Cordless Telecommunications (DECT) standard, wherein said first communication means comprise a plurality of radio access units arranged at said distribution centers and/or district centers for communication with said subscriber sections through said district sections, feeder sections and drop sections of said CaTV network, and wherein said subscriber sections comprise Network Terminal Unit (NTU) means comprising a DECT repeater arranged for up-converting to the DECT standard frequency band of said low-end frequency sub-band DECT signals for radio transmission by said NTU means to provide wireless radio communication at said subscriber sections, and for down-converting to DECT signals for transmission at said low-end frequency sub-band in said CaTV network of signals at the DECT standard frequency band received by said NTU means from wireless radio communication at said subscriber sections wherein NTU further comprises a first filter section, said first filter section has a first output for outputting telephone signals to an interface via said DECT repeater, said first filter section has a second output for outputting multimedia signals and said first filter section has third output for outputting a third signal to the input of a second filter section, said second filter section having a first output for outputting radio signals and said second filter section having a second output for outputting television signals, wherein said interface comprises a first access terminal for bi-directional telephony communication and a second access terminal for upstream communication.

2. An arrangement according to claim 1, wherein each district section connects to at least one separate radio access unit.

3. An arrangement according to claim 1, wherein said radio access units are arranged at said intermediate trunk units.

4. An arrangement according to claim 3, wherein each distribution section connects to at least one separate radio access unit.

5. An arrangement according to claim 1, wherein said a plurality of radio access units connect by a data link connection to a Radio Node Controller (RNC) connecting to a network exchange, such as Private Branch exchange (PBX) and/or an exchange of a Public Switched Telephone Network (PSTN).

6. An arrangement according to claim 5, wherein said data link connection forms part of the CaTV network.

7. An arrangement according to claim 1, wherein said NTU comprise a wired telephone socket for connecting a wired telephone terminal for communication through said first communication means.

8. An arrangement according to claim 1, further comprising second communication means operative in accordance with a second transmission protocol serving at least downstream communication at high data rates, and third communication means connected to said first and second communication means and serving at least downstream communication at high data rates and upstream communication at DECT based data rates through said first communication means.

9. An arrangement according to claim 8, wherein said second and third communication means are arranged to operate in accordance with a Time Division Multiple Access (TDMA) radio communication protocol.

10. A method of integrated telecommunication via a Cable TeleVision (CaTV) network in a first or downstream direction from a first or head-end section to second or subscriber sections and in a second or upstream direction from said second or subscriber sections to said first or head-end section, through intermediate trunk, distribution centers and distribution sections, district centers and district sections, feeder sections and drop sections, intermediate trunk units connecting said trunk and distribution sections, and distribution centers and/or district centers connecting said distribution and district sections, wherein communication is served through said CaTV network at a low-end frequency sub-band thereof in accordance with the Digital Enhanced Cordless Telecommunications (DECT) standard, comprising the steps of:

serving upstream and downstream DECT communication at a low-end frequency sub-band of said district sections, feeder sections, and drop sections of said CaTV network, at said subscriber sections, up-converting by a DECT repeater to the DECT standard frequency band of said low-end frequency sub-band DECT signals by Network Terminal Unit (NTU) means and radio transmission of said up-converted DECT signals by said NTU means for providing wireless radio communication at said subscriber sections, and at said subscriber sections, down-converting to DECT signals at said low-end frequency sub-band of said CATV network and transmission thereof through said drop, feeder and district sections to said radio access units of signals at said DECT standard frequency band received by said NTU means filtering input signals by a first filter section in said NTU, outputting telephone signals via a first output from said first filter section to an interface via said DECT repeater, outputting multimedia signals via a second output from said first filter section, outputting a third signal via a third output from said first filter section to an input to a second filter section in said NTU, outputting radio signals via a first output from said second filter section in said NTU, outputting television signals via a second output from said second filter section in said NTU, wherein said interface comprises a first access terminal for accessing bi-directional telephony communication and a second access terminal for accessing upstream communication.

11. A method according to claim 10, further comprising serving at least downstream communication at high data rates by a second transmission protocol, and serving at least upstream communication by said DECT transmission in connection with said downstream communications served by said second transmission protocol.

* * * * *